Jan. 3, 1956  F. W. RITCHIE ET AL  2,729,520
ROLLER BEARING ASSEMBLY
Filed Jan. 9, 1953

INVENTORS
FRANK W. RITCHIE
LEONHARD A. MAAS
By Albert Sperry.
ATTORNEY

United States Patent Office 2,729,520
Patented Jan. 3, 1956

2,729,520

ROLLER BEARING ASSEMBLY

Frank W. Ritchie, Rumson, and Leonhard A. Maas, Trenton, N. J., assignors to The Smith Bearing Company, Inc., Trenton, N. J., a corporation of New Jersey Application January 9, 1953, Serial No. 330,442

3 Claims. (Cl. 308—213)

This invention relates to roller bearing assemblies and is directed particularly to constructions in which the rollers are held in predetermined spaced relation by means of a roller cage.

The use of cages has been common practice in ball bearing assemblies for holding the balls in uniformly spaced relation. While roller bearing assemblies have not generally used such cages, it has been suggested that a split ring cage be provided, as exemplified by the patent to Reiss No. 2,503,070. However, the ends of such a split ring cage may be displaced axially with respect to the rollers due to end thrust causing skewing of the rollers, whereas circumferential displacement of the ends of the ring due to expansion or contraction results in the projection of sharp edges which engage the rollers and may even be broken off and become jammed between the rollers.

In accordance with the present invention roller bearing assemblies are provided with a split ring cage for holding the rollers in spaced relation and are further designed to overcome skewing of the rollers, to eliminate all sharp edges or portions which might otherwise engage the rollers, and to oppose end thrust of the rollers.

These advantages are preferably obtained by forming the adjacent ends of the split ring cage with interfitting portions which prevent lateral displacement thereof even when subjected to end thrust. Moreover, circumferential expansion or contraction of the cage does not impair its operation so that extreme accuracy in machining of the cages, races and lands is not required.

One of the objects of the present invention is to provide a novel type of roller bearing assembly in which a split ring cage is employed.

Another object of the invention is to provide a new type of split ring cage for use in roller bearing assemblies wherein the ends of the ring are interfitted in a manner to prevent transverse displacement thereof.

A further object of the invention is to provide a roller bearing assembly and a cage therefor whereby end thrust of the rollers may be opposed.

These and other objects and features of the present invention will appear from the following description thereof in which reference is made to the figures of the accompanying drawing.

Figure 1:
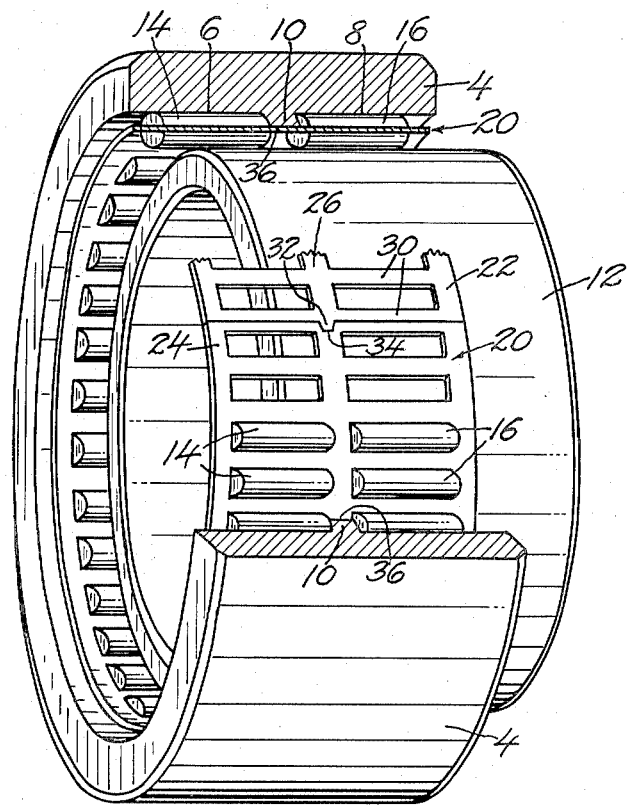
Fig. 1 is a perspective of a typical roller bearing assembly embodying the present invention with portions broken away.
Figure 2:
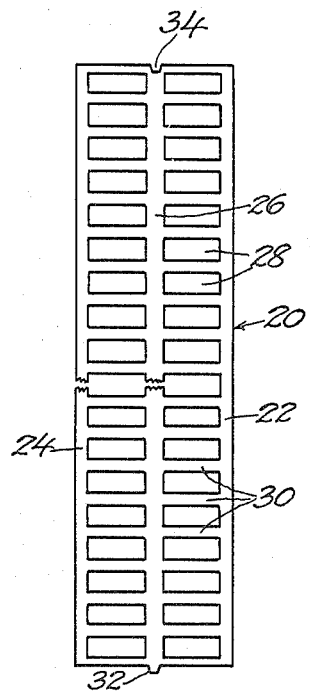
Fig. 2 is a plan view of the form of cage embodied in the assembly of Fig. 1.

In that form of the invention chosen for purposes of illustration in Figs. 1 and 2, the roller bearing assembly embodies an outer race member 4 presenting two marginal raceways 6 and 8 which are separated by a central divider 10. An inner race member 12 presents an outer race surface engaged by the two sets of rollers 14 and 16 which engage the raceways 6 and 8 respectively of the outer race member.

In accordance with the present invention, the rollers 14 and 16 are held in predetermined spaced relation by means of a cage 20 which, as shown in Fig. 2, is preferably formed from an elongated strip of material having side portions 22 and 24 and a central web 26. Roller receiving openings 28 are formed in the strip between the side portions 22 and 24 and on the opposite sides of the central web 26. The rollers 14 and 16 are positioned within the openings 28 and are held in properly spaced relation and prevented from twisting or skewing during use by the separators 30.

The strip of material as shown in Fig. 2 is readily formed from continuous strip stock which can be punched to form the openings 28 and may be severed to the desired length and thereafter formed into a ring for insertion within the outer race member to provide a cage in the form of a broken ring. The opposite ends of the strip of material are formed with interfitting elements which, as shown in Figs. 1 and 2, may be in the form of a tongue 32 located on one end of the strip and engageable with a recess 34 on the opposite end of the strip. When the strip is formed into a ring the ends may be overlapped for insertion of the cage into place and the ring thus formed may thereafter be expanded to engage and bear against the land 36 on the inner surface of the central divider 10 of the outer race member. When in this position the tongue 32 will enter the recess 34 so as to provide an interfitting engagement between the opposite ends of the cage. The elements 32 and 34 prevent axial displacement of the ends of the cage so that the rollers will be held accurately aligned during use. At the same time, the length of the tongue 32 and the depth of the recess 34 may be sufficient to permit limited circumferential movement or expansion of the cage. The cage can therefore be made with a reasonable degree of tolerance as to its length and the inner land 36 of the divider 10 need not be machined with the same degree of tolerance which would otherwise be necessary.

As shown in Fig. 1, the cage 20 is designed to ride upon the land 36 of the divider 10 and when properly positioned, the central web 26 of the cage is positioned so that it bears continuously upon the land 36, whereas the roller receiving openings 28 are located on opposite sides of the divider 10. In the event of end thrust the divider may shift a limited distance axially of the assembly upon the land 36, but will be held against undesired movement by engagement of one of the rollers 14 or 16 with the lateral shoulders of the divider 10 and thereby will prevent undue axial movement of the cage and the other set of rollers. In this way the cage serves to take up end thrust. At the same time, the rollers and divider 10 prevent undue axial movement of the cage.

Figure 3:
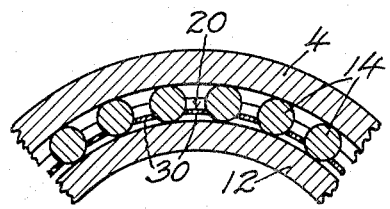
Fig. 3 is a sectional view through a portion of an alternative assembly embodying the present invention.

While there are many instances in which it is desirable to have the cage bear directly upon the land 36 of the divider 10, the cage, may if desired, be arranged as shown in Fig. 3 wherein the width of the roller receiving openings 28 and the width of the separators 30 are such that the cage will ride upon the rollers themselves and be spaced from the divider 10. In this construction, the cage is carried directly by the rollers and has no positive engagement with either of the race members 6 and 12.

In assembling either of the forms of bearings shown in Figs. 1 and 3, the rollers 14 and 16 are placed within openings 28 of the cage and the cage is formed into a ring being compressed so that its ends overlap to permit insertion of the cage and rollers past the central divider 10. Thereafter, the ring with its rollers is allowed to expand until the ends of the ring move into alignment with the tongue 32 projecting into the recess 34. The rollers and cage are thus held in place for easy insertion of the inner race member 12 or for application of the assembly to a shaft presenting an outer surface for engagement with the rollers.

Figure 4:
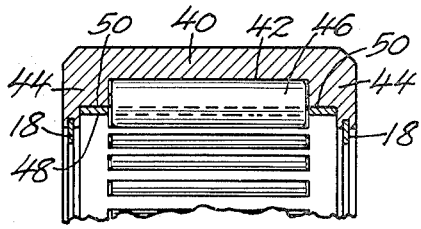
Fig. 4 is a transverse sectional view through a further alternative form of roller bearing assembly embodying the present invention.
Figure 5:
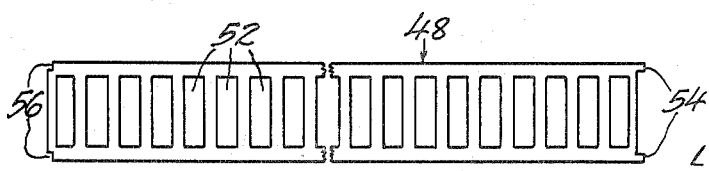
Fig. 5 is a plan view showing the cage embodied in the construction of Fig. 4.

As shown in Figs. 4 and 5, the present invention is also adapted for use in roller bearing assemblies in which a single set of rollers is employed. In this form of the invention, the outer race member 40 presents an inwardly facing channel defining a raceway 42 with shoulders 44 at opposite sides of the race way. The rollers 46 move within the channel of the member 40 and are spaced apart by means of a cage 48, which, if desired, may bear directly upon the lands 50 of the shoulders 44. The cage 48 as shown in Fig. 5 has a single row of roller receiving recesses 52 and the opposite ends of the cage are formed with complementary interfitting elements such as the tongues 54 and the recesses 56. When in assembled relation, the race members and rollers may be held in relatively fixed positions by means of a retaining ring 18 such as that shown and described in the patent to Smith No. 2,360,078.

In each of the forms of the invention illustrated, the cage serves to hold the rollers in engagement with an outer race member formed with a divider or shoulder for limiting the axial movement of the rollers and cage. It will be apparent that the relation of these elements may be reversed in that the inner race member may be formed with a divider or channel for receiving the rollers and the outer race member may present a plane inwardly facing surface. It will also be apparent that the particular type of interfitting means for preventing axial displacement of the ends of the cage may be varied considerably. Furthermore, the cage may be constructed for direct engagement with the lands on the divider or shoulders or, if preferred, the cage may engage and be supported by the rollers themselves so as to be spaced from the divider or shoulders. The material of which the cage is formed and the manner in which it is produced obviously can be varied. Numerous other changes and modifications may be made in the form, construction and arrangement of the elements of the assembly. In view thereof it should be understood that the particular embodiments of the invention shown in the drawing and described above are intended to be illustrative only and are not intended to limit the scope of the invention.

We claim:

1. A roller bearing assembly comprising inner and outer race members with two parallel sets of rollers therebetween, one of said members having two parallel roller receiving races separated by a centrally located divider, a cage extending across said divider between the race members, said cage having roller receiving recesses therein and being in the form of a ring which is split transversely, and means on the adjacent ends of the ring preventing relative lateral displacement of said ends while permitting circumferential displacement thereof.

2. A roller bearing assembly comprising inner and outer race members with two parallel sets of rollers therebetween, one of said members having two parallel roller receiving raceways separated by a centrally located divider, a cage extending across said divider and bearing against a land thereon, said cage having roller receiving recesses therein and being in the form of a ring which is split transversely, and means on the adjacent ends of the ring preventing relative lateral displacement of said ends while permitting circumferential displacement thereof.

3. A roller bearing assembly comprising inner and outer race members with two parallel sets of rollers therebetween, one of said members having two parallel roller receiving raceways separated by a centrally located divider, a cage extending across said divider and over said raceways between the race members, said cage having roller receiving recesses therein and being in the form of a ring which is split transversely, and tongues and recesses formed on the adjacent ends of the cage and having interfitting relation preventing relative lateral displacement of said ends while permitting circumferential displacement thereof.

References Cited in the file of this patent

UNITED STATES PATENTS

| 1,651,815 | Gibbons | Dec. 6, 1927 |
| 2,503,070 | Reiss | Apr. 4, 1950 |
| 2,644,730 | Levine | July 7, 1953 |
| 2,659,636 | Wheelis | Nov. 17, 1953 |

FOREIGN PATENTS

| 19,315 | Great Britain | 1898 |